(12) United States Patent  
Gruber

(10) Patent No.: US 9,316,144 B2
(45) Date of Patent: Apr. 19, 2016

(54) PRE-CHAMBER SYSTEM FOR AN INTERNAL COMBUSTION ENGINE

(71) Applicant: GE Jenbacher GmbH & Co OG, Jenbach (AT)

(72) Inventor: Friedrich Gruber, Hippach (AT)

(73) Assignee: GE JENBACHER GMBH & CO OG, Jenbach (AT)

( * ) Notice: Subject to any disclaimer, the term of this patent is extended or adjusted under 35 U.S.C. 154(b) by 221 days.

(21) Appl. No.: 14/034,996

(22) Filed: Sep. 24, 2013

(65) Prior Publication Data

US 2014/0083391 A1    Mar. 27, 2014

(30) Foreign Application Priority Data

Sep. 26, 2012 (AT) .............................. A 1048/2012

(51) Int. Cl.
| | |
|---|---|
| *F02B 23/04* | (2006.01) |
| *F02B 19/12* | (2006.01) |
| *F02B 19/10* | (2006.01) |
| *F02B 19/16* | (2006.01) |

(52) U.S. Cl.
CPC .............. *F02B 23/04* (2013.01); *F02B 19/1095* (2013.01); *F02B 19/12* (2013.01); *F02B 19/16* (2013.01); *Y02T 10/125* (2013.01)

(58) Field of Classification Search
CPC ...... F02B 19/1095; F02B 19/12; F02B 23/04; F02B 19/16
USPC .................................. 123/256, 260, 261, 267
See application file for complete search history.

(56) References Cited

U.S. PATENT DOCUMENTS

| | | | | | |
|---|---|---|---|---|---|
| 1,753,253 | A | * | 4/1930 | Tacchella ................... | F02B 7/02 |
| | | | | | 123/260 |
| 2,012,086 | A | * | 8/1935 | Mock ......................... | F02B 1/00 |
| | | | | | 123/261 |
| 3,102,521 | A | * | 9/1963 | Slemmons ............. | F02M 69/00 |
| | | | | | 123/263 |

(Continued)

FOREIGN PATENT DOCUMENTS

| | | |
|---|---|---|
| CN | 2295053 | 10/1998 |
| CN | 2532249 | 1/2003 |

(Continued)

OTHER PUBLICATIONS

Austrian Patent Office Search Report (ASR) issued Feb. 22, 2013 in Austrian Patent Application No. A 1048/2012.

(Continued)

*Primary Examiner* — Mahmoud Gimie
(74) *Attorney, Agent, or Firm* — Wenderoth, Lind & Ponack, L.L.P.

(57) ABSTRACT

A pre-chamber system for an internal combustion engine, in particular for a gas engine, includes a pre-chamber volume in which an ignitable fuel-air mixture can be fired by an ignition device which can be arranged at the pre-chamber system. The pre-chamber system has a flow transfer passage by which the pre-chamber volume can be connected to a main combustion chamber of the internal combustion engine. The pre-chamber volume includes an ignition region and a flow transfer region which is at least portion-wise delimited from the ignition region by an intermediate wall. The fuel-air mixture can be fired in the ignition region, and the flow transfer passage opens into the flow transfer region and there is provided an air feed passage. Preferably compressed air can be fed to the flow transfer region by way of the air feed passage.

21 Claims, 4 Drawing Sheets

(56) References Cited

U.S. PATENT DOCUMENTS

| | | | |
|---|---|---|---|
| 3,987,765 A | | 10/1976 | Sato et al. |
| 4,071,001 A | * | 1/1978 | Goto ............... F02B 19/1066 123/260 |
| 4,218,993 A | | 8/1980 | Blackburn |
| 4,404,938 A | * | 9/1983 | Nikolic ............... F02B 19/12 123/256 |
| 4,467,759 A | * | 8/1984 | Artman ............ F02B 19/1028 123/260 |
| 4,483,291 A | * | 11/1984 | Artman ............... F02B 19/12 123/260 |
| 4,696,270 A | | 9/1987 | Pischinger |
| 5,060,609 A | * | 10/1991 | Merritt ............... F02B 33/14 123/256 |
| 5,947,076 A | | 9/1999 | Srinivasan et al. |
| 2011/0004393 A1 | * | 1/2011 | Baeuerle ............ F02B 29/083 701/102 |

FOREIGN PATENT DOCUMENTS

| | | |
|---|---|---|
| CN | 101960114 | 1/2011 |
| DE | 35 06 217 | 8/1986 |
| DE | 10 2008 062 574 | 6/2010 |
| EP | 2 292 922 | 3/2011 |
| JP | 51-8214 | 1/1976 |
| JP | 7-30329 | 6/1995 |
| JP | 2010-265836 | 11/2010 |
| WO | 2010/072519 | 7/2010 |

OTHER PUBLICATIONS

English translation of European Search Report (ESR) issued Nov. 25, 2013 in corresponding European Patent Application No. EP 13 00 4470.

Chinese Search Report issued Jul. 29, 2015 in corresponding Chinese Application No. 201310738497.2.

* cited by examiner

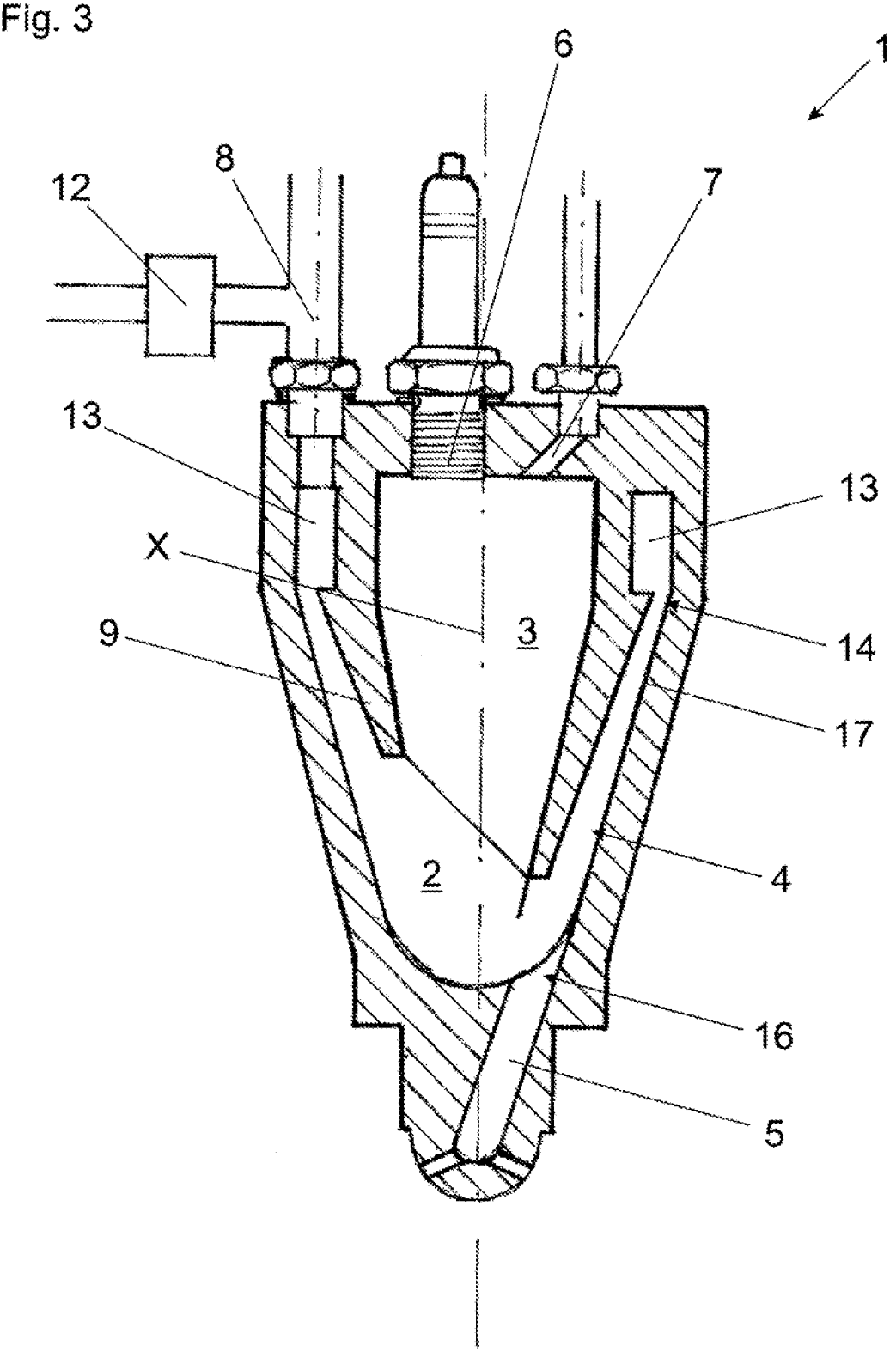

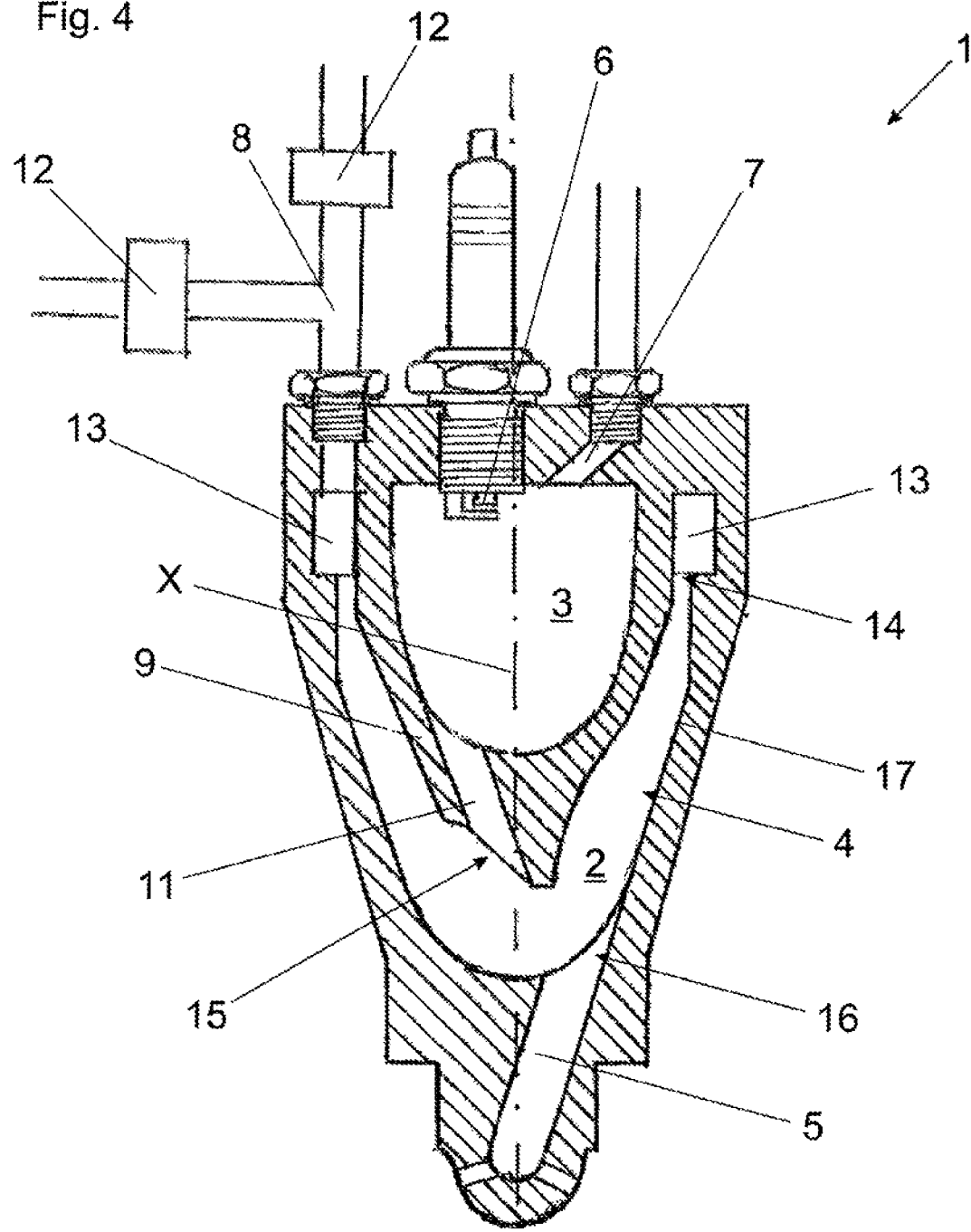

PRE-CHAMBER SYSTEM FOR AN INTERNAL COMBUSTION ENGINE

BACKGROUND OF THE INVENTION

The present invention concerns a pre-chamber system for an internal combustion engine, as well as an internal combustion engine having such a pre-chamber system.

In operation of an internal combustion engine—in particular a gas engine—with a substantially stoichiometric ratio of fuel and air, very high temperatures can occur. These high temperatures are detrimental to the exhaust gas behavior of such an engine. It is possible to counteract that situation by exhaust gas recycling. That, however, leads to a worsening in terms of the ignition characteristics.

Using a pre-chamber to be filled with combustion gas for ignition purposes in that case, as is a standard solution adopted in regard to large-volume lean-burn engines, is initially problematic. The mixture which upon compression is urged out of the main combustion chamber into the pre-chamber does not in fact have an air excess, whereby a fuel-air mixture which can be well ignited does not prevail in the pre-chamber.

In DE 35 06 217 A1, that problem is avoided by a near-stoichiometrically mixed fuel gas already being fed to the pre-chamber. A disadvantage in that respect, besides the increased structural complication and expenditure, is that when the injection valve of the pre-chamber suffers from wear, there is the possibility of back-ignition of the pre-chamber mixture into the supply passages. That represents a safety risk which should be avoided.

SUMMARY OF THE INVENTION

The object of the present invention is to provide a pre-chamber system which, even in a stochiometric mode of operation of a large-volume engine with substantial exhaust gas recycling, allows good ignition of the fuel-air mixture in the pre-chamber without at the same time introducing a safety risk due to the presence of an ignitable fuel-air mixture outside the combustion chambers.

Dividing the pre-chamber space into an ignition region and a flow transfer region which is at least partially separated from the ignition region by an intermediate wall and introducing air through the air feed passage into the flow transfer region provides that a minimum of exhaust gas-bearing combustion mixture passes out of the main combustion chamber into the ignition region during the compression phase. At the same time, that main chamber gas urges the air introduced through the air feed passage into the ignition region, thereby affording there a mixture which can enjoy good ignition. In that way, a lambda value of between 0.8 and 1.2 can be achieved in the ignition region of the pre-chamber, wherein the lambda value relates to the ratio of air to fuel and the lambda value of 1 represents the ideal, that is to say stoichiometric, ratio.

DE 10 2008 062 574 A1 discloses a spark plug for an internal combustion engine, which has a post-chamber volume region, wherein that post-chamber volume region at least partially surrounds a combustion chamber-side end region of the spark plug. That however only serves to increase the volume of the pre-chamber, and does not attain the present object. The absence of an intermediate wall does not prevent the mixture from passing from the main combustion chamber to the ignition region upon compression.

To make it easier for the ignition flame produced by ignition in the pre-chamber to reach the main combustion chamber, a connecting passage can be provided in the intermediate wall, the connecting passage connecting the ignition region to the flow transfer region.

To achieve uniform cooling of the entire pre-chamber by virtue of the injected air, the intermediate wall can have a substantially peripherally extending configuration in relation to a longitudinal axis of the pre-chamber system. The flow transfer region substantially surrounds the ignition region—separated by the peripherally extending intermediate wall.

A preferred embodiment is one in which, by way of the air feed passage, a—preferably cooled—charge air of the internal combustion engine and/or a compressed air—preferably compressed to between 6 bars and 10 bars—can be introduced into the flow transfer region. That further contributes to effectively keeping the exhaust gas-bearing mixture away from the ignition region.

In that case, for energy reasons, firstly charge air which is typically available at a pressure of between 2 and 3 bars from a turbocharger is fed and then, as soon as the pressure in the pre-chamber exceeds the pressure of the charge air, compressed air is fed.

For precise control or regulation of the period of time of the air feed or the amount of air which is fed, arranged at the air feed passage is a valve which is preferably electronic.

For optimum propagation of the fed air, a peripherally extending annular passage is provided in the flow transfer region in relation to a longitudinal axis of the pre-chamber system, wherein preferably the air feed passage opens into the annular passage. To permit a rolling-like inflow of the air, a peripherally extending annular gap can be provided between the annular passage and the rest of the flow transfer region. Considered radially with respect to the longitudinal axis, the annular passage has an annular passage width and the annular gap has an annular gap width, and preferably the annular gap width is less than the annular passage width.

So that there is a sufficiently large available volume for pressure equalization, a flow transfer volume of the flow transfer region can be larger than an ignition volume of the ignition region.

The connecting passage can have a connecting passage opening, and the connecting passage opening opens into the flow transfer region. As it is advantageous in terms of fluid mechanics, in relation to a longitudinal axis of the pre-chamber starting from the connecting passage opening, a sub-volume of the flow transfer region that faces away from the ignition region is smaller than the remaining residual volume of the flow transfer region.

To achieve particularly directed discharge of the flow, the ratio of a passage diameter of the flow transfer passage to a passage length of the flow transfer passage can be at a maximum 0.25. Thus, the flow transfer passage of the pre-chamber system can have an inclinedly extending configuration with respect to the longitudinal axis, and also the flow transfer passage with its flow transfer passage opening which opens into the flow transfer region can be substantially tangential in relation to an inside wall of the pre-chamber system. As a result, the flow of the fuel-air mixture which flows into the pre-chamber due to the compression effect faces away from the ignition volume of the pre-chamber.

In order in comparison to guarantee a directed flow of the ignition flame into the flow transfer passage, the connecting passage opening—or at least a part of its cross-section—can extend in the direction of the flow transfer passage opening.

BRIEF DESCRIPTION OF THE DRAWINGS

Further advantages and details of the invention will be apparent from the Figures and the related specific description.

In that respect, FIGS. 1 through 4 show sectional views of various configurations of pre-chamber systems according to the invention.

DETAILED DESCRIPTION OF THE INVENTION

Figure 1:
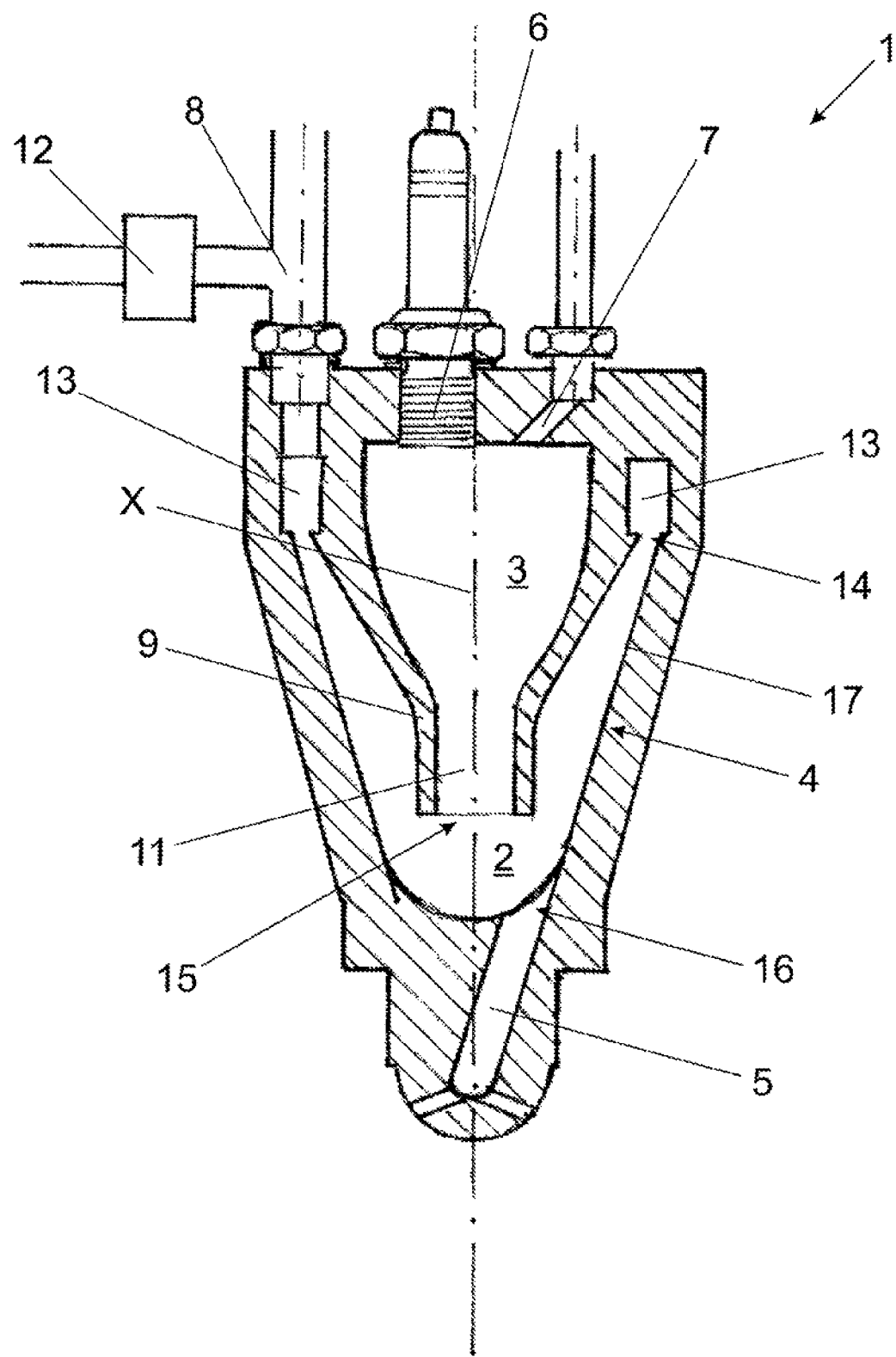

FIG. 1 firstly shows the pre-chamber volume (space) 4 of the pre-chamber system 1, the ignition device 6, the flow transfer passage 5 with its flow transfer passage opening 16, and a fuel gas passage 7. The flow transfer region 2 is delimited (separated) from the ignition region 3 by an intermediate wall 9, the two regions 2,3 being connected by a connecting passage 11 with a connecting passage opening 15. The flow transfer passage 5 is here tangential relative to the inside wall 17. An annular passage 13 which is formed in an annular configuration around the longitudinal axis X is connected to the rest of the flow transfer region 2 by an annular gap 14. The air feed passage 8 opens into the annular passage 13, and the air feed passage 8 permits both the feed of charge air and also the feed of compressed air, the feed of compressed air being regulated by an electronic valve 12.

Figure 2:
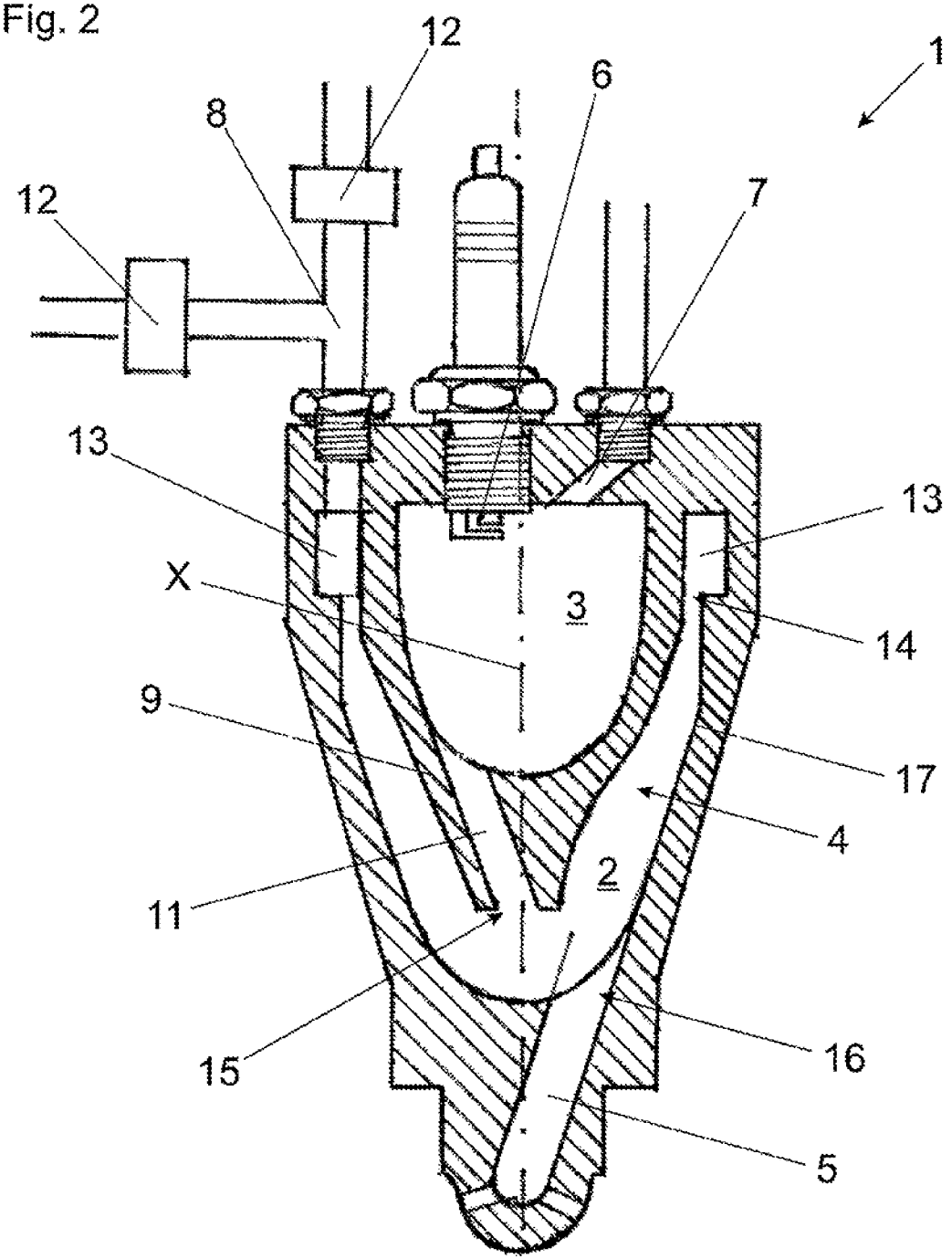

FIG. 2 shows a pre-chamber system according to the invention in which the connecting passage 11 is also inclined with respect to the longitudinal axis X. In addition, there is a second electronic valve 12 which regulates the feed of charge air.

FIG. 3 shows an embodiment without a connecting passage 11.

FIG. 4 shows an embodiment which is similar to FIG. 2, but with a different geometry of the flow transfer passage 11. In particular, the flow transfer passage opening 15 is different (shorter).

The present invention is not limited to the foregoing embodiments. For example, the flow transfer passage can be arranged centrally along the longitudinal axis. In that respect, it may be advantageous for the connecting passage opening to be arranged to face away from the flow transfer passage opening. A mixture, for example with a lambda value of 0.3, could also be supplied by way of the fuel gas passage 7.

The invention claimed is:

1. A pre-chamber system for an internal combustion engine, comprising:
   a pre-chamber space in which an ignitable fuel-air mixture is to be fired;
   a flow transfer passage connecting said pre-chamber space to a main combustion chamber of the internal combustion engine;
   an intermediate wall within said pre-chamber space; and
   an air feed passage;
   wherein said pre-chamber space includes an ignition region in which the ignitable fuel-air mixture is to be fired, and a flow transfer region at least partially separated from said ignition region by said intermediate wall;
   wherein said flow transfer passage opens into said flow transfer region of said pre-chamber space, and said air feed passage is configured to feed air to said flow transfer region of said pre-chamber space.

2. The pre-chamber system as set forth in claim 1, wherein said intermediate wall has a connecting passage connecting said ignition region to said flow transfer region.

3. The pre-chamber system as set forth in claim 1, wherein said intermediate wall extends substantially peripherally around a longitudinal axis of said pre-chamber system, and said flow transfer region substantially surrounds said ignition region and is separated from said ignition region by said peripherally-extending intermediate wall.

4. The pre-chamber system as set forth in claim 1, wherein said air feed passage is configured to introduce at least one of charge air of the internal combustion engine and compressed air into said flow transfer region.

5. The pre-chamber system as set forth in claim 4, wherein said air feed passage is configured to introduce at least one of cooled charge air and compressed air at a pressure of between 6 bars and 10 bars into said flow transfer region.

6. The pre-chamber system as set forth in claim 1, further comprising a control valve for controlling or regulating at least one of a period of supply time and an amount of the air in said air feed passage.

7. The pre-chamber system as set forth in claim 6, wherein said control valve is a preferably electronic valve.

8. The pre-chamber system as set forth in claim 1, further comprising an annular passage in said flow transfer region extending peripherally around a longitudinal axis of said pre-chamber system.

9. The pre-chamber system as set forth in claim 8, wherein said air feed passage opens into said annular passage.

10. The pre-chamber system as set forth in claim 8, wherein said flow transfer region has an annular gap between said annular passage and a remaining portion of said flow transfer region, said annular gap extending peripherally around the longitudinal axis of said pre-chamber system, a radial width of said annular gap being less than a radial width of said annular passage.

11. The pre-chamber system as set forth in claim 1, wherein a flow transfer volume of said flow transfer region is larger than an ignition volume of said ignition region.

12. The pre-chamber system as set forth in claim 1, wherein said intermediate wall has a connecting passage with a connecting passage opening into said flow transfer region.

13. The pre-chamber system as set forth in claim 12, wherein said pre-chamber space is configured such that, relative to a longitudinal axis of said pre-chamber starting from said connecting passage opening, a volume of a first portion of said flow transfer region facing away from said ignition region is smaller than a volume of a remaining second portion of said flow transfer region.

14. The pre-chamber system as set forth in claim 1, wherein said flow transfer passage is configured such that a ratio of a diameter of said flow transfer passage to a length of said flow transfer passage is no greater than 0.25.

15. The pre-chamber system as set forth in claim 1, wherein said flow transfer passage extends at an incline relative to a longitudinal axis of said pre-chamber system.

16. The pre-chamber system as set forth in claim 1, wherein said flow transfer passage has a flow transfer passage opening into said flow transfer region.

17. The pre-chamber system as set forth in claim 16, wherein said flow transfer passage opening opens into said flow transfer region substantially tangentially relative to an inner wall of said pre-chamber system.

18. The pre-chamber system as set forth in claim 1, wherein said intermediate wall has a connecting passage with an opening facing an opening of said flow transfer passage.

19. The pre-chamber system as set forth in claim 18, wherein only a part of a cross-section of said opening of said connecting passage faces said opening of said flow transfer passage.

20. The pre-chamber system as set forth in claim 1, further comprising an ignition device for firing the ignitable fuel-air mixture.

21. An internal combustion engine comprising a pre-chamber system as set forth claim 1.

* * * * *